United States Patent
Hediger

(10) Patent No.: US 9,863,751 B2
(45) Date of Patent: Jan. 9, 2018

(54) MEASURING MACHINE FOR MEASURING WORKPIECES

(71) Applicant: Erowa AG, Reinach (CH)

(72) Inventor: Hans Hediger, Reinach (CH)

(73) Assignee: EROWA AG, Reinach (CH)

(*) Notice: Subject to any disclaimer, the term of this patent is extended or adjusted under 35 U.S.C. 154(b) by 293 days.

(21) Appl. No.: 14/965,471

(22) Filed: Dec. 10, 2015

(65) Prior Publication Data

US 2016/0216098 A1 Jul. 28, 2016

(30) Foreign Application Priority Data

Jan. 23, 2015 (CH) .......................................... 86/15

(51) Int. Cl.
| | | |
|---|---|---|
| *G01B 7/00* | (2006.01) | |
| *G01B 5/008* | (2006.01) | |
| *B23Q 7/10* | (2006.01) | |
| *G01B 21/04* | (2006.01) | |
| *G01B 7/008* | (2006.01) | |
| *G01B 11/00* | (2006.01) | |

(52) U.S. Cl.
CPC .............. *G01B 5/008* (2013.01); *B23Q 7/10* (2013.01); *G01B 7/008* (2013.01); *G01B 11/005* (2013.01); *G01B 21/04* (2013.01); *G01B 21/047* (2013.01)

(58) Field of Classification Search
CPC .... B23Q 1/0072; B23Q 3/06; B23Q 11/0032; B23Q 3/183; B23Q 7/10; G01B 11/005; G01B 21/04; G01B 21/047; G01B 5/008; G01B 7/008
USPC ......................................................... 33/503
See application file for complete search history.

(56) References Cited

U.S. PATENT DOCUMENTS

2011/0146092 A1* 6/2011 Engel ..................... G01B 5/012
33/503
2015/0055143 A1* 2/2015 Engel .................. G01B 21/047
356/614
(Continued)

FOREIGN PATENT DOCUMENTS

DE           3417741 A1    11/1985
DE           4227817 A1     2/1994
(Continued)

OTHER PUBLICATIONS

Switzerland International Search Report corresponding to Switzerland application No. 00086/15, dated Apr. 20, 2015 (3 pages).

*Primary Examiner* — Yaritza Guadalupe-McCall
(74) *Attorney, Agent, or Firm* — Maginot, Moore & Beck, LLP

(57) ABSTRACT

The measuring machine (1) for measuring workpieces (23, 23a) features a machine table (2) and a mechanical device comprising a measuring slide movable in a first linear axis and a cross slide movable in a second linear axis, and a quill shaft (7) arranged on the cross slide and movable in a third linear axis. Arranged on the quill shaft (7) is, in addition to a sensor (9) for measuring the workpiece, also a gripper (11) by means of which a workpiece (23a) can be retrieved from a magazine (22) and transferred to the clamping device (20), or retrieved from the clamping device (20) and transferred to the magazine (22). Due to this configuration the existing mechanical device of the measuring machine (1) can be made use of to mechanically transfer and also retrieve a workpiece (23, 23a) being measured.

16 Claims, 5 Drawing Sheets

(56) References Cited

U.S. PATENT DOCUMENTS

2016/0076867 A1* 3/2016 Ruck .................. G01B 21/047
                                                                             33/503
2016/0216098 A1* 7/2016 Hediger .................. B23Q 7/10

FOREIGN PATENT DOCUMENTS

| DE | 102007004423 A1 | 7/2007 | |
| JP | 2003106816 A | 4/2003 | |
| WO | WO 9309398 A1 * | 5/1993 | ............... B23Q 5/58 |

* cited by examiner

MEASURING MACHINE FOR MEASURING WORKPIECES

The invention relates to a measuring machine for measuring workpieces. Generic measuring machines are mostly termed coordinate measuring devices or coordinate measuring machines. Such measuring machines comprise a machine table to which the workpiece being measured is clamped or located in place. To measure the workpiece the measuring machine comprises a mechanical device by means of which a sensor can be travelled in at least three coordinate axes so that the surface of the workpiece can be sensed or measured. Arranged on the machine table is preferably a clamping fixture by means of which the workpiece or a pallet carrying the workpiece can be fixed in place. Preferably, however, the workpiece is secured to a pallet which is provided with positioning means and a collet, and the like, so that the workpiece is able to be easily and quickly clamped in place to the clamping fixture featuring the corresponding positioning means. One such clamping fixture—coupling fixture—is known for example from EP 111 092. It is usually the case that the workpieces to be measured are made available to the measuring location manually or by means of a robotic handling device or transferred to the clamping fixture. Making available the workpieces manually, however, involves an operator for this purpose and thus is costly. Making available the workpieces mechanically by means of a handling device is likewise costly since procuring a handling device suitable for the cited purpose, i.e. usually a 2 to 6 axes robotic handling device is not without complications. Another disadvantage in using a handling device is "footprint", the space it takes up.

Known from DE 3417741 A1 is a device for measuring and optionally making available workpieces from a standby position to a machining position. This device is configured in the form of a loading gantry comprising two supports and a cross bracket. Shiftingly arranged on the cross bracket is a slide which in turn carries a quill shaft. The quill shaft is fitted with a measuring probe. From the description it reads that instead of the quill shaft fitted with a measuring probe on the slide, one or more grippers may likewise be fitted with which a workpiece can be transferred from a standby position into a machining position of a lathe or machining center. The workpiece itself is secured to the machine table by means of clamps.

Known from DE 4227817 A1 is a multiple measuring device for surface measurements. This device comprises a machine table to which the object being measured is secured. Mounted to travel on the machine table is a positioning device carrying a sensor. Additionally arranged on the machine table is a magazine holding the various measuring elements.

The object of the present invention is to provide a measuring machine of the generic kind as cited at the outset which now makes it possible to mechanically feed the workpieces to be measured to the clamping fixture arranged on the machine table of the measuring machine or retrieval of same without having to provide a separate multiaxial handling device.

Achieving this object is defined by the features of claim 1. In accordance with the invention the measuring machine is assigned a crib for holding a plurality of workpieces to be measured or the measuring machine comprises a crib for holding a plurality of workpieces to be measured, wherein the quill shaft is configured such that in addition to the sensor also a gripper is fixable thereto, by means of which a workpiece is transferable from the crib to the clamping device or retrieved from the clamping device respectively transferred to the crib. By configuring the measuring machine in accordance with the invention its existing mechanical device can now be made use of to transfer the workpieces to be measured from the crib to the measuring location, namely the clamping device and retrieved therefrom. This permits cost savings since, now, neither a manual operator not a separate handling device needs to be provided for feeding the workpieces to be measured to the measuring location on the machine table or for retrieving them from the measuring location and for transfer to a crib.

A measuring machine is able as such by means of the existing mechanical device retrieve the workpieces from a crib, transfer them to the measuring location, measure the workpieces and then return them to a crib. It is understood that separate cribs can be provided, where necessary, to accommodate the workpieces to be measured and the workpieces already measured.

Where the workpieces to be measured are arranged on pallets as is provided for in a preferred variant the measuring machine is preferably configured so that the clamping device is configured to clamp the pallets componented with workpieces and the gripper serves to pick the pallets componented with workpieces. The pallets componented with workpieces can now be speedily and repeatedly exactly clamped in place by means of the clamping device.

In one preferred embodiment of the measuring machine the mechanical device comprises a measuring slide movable in a first linear axis and a cross slide movable to a second linear axis, the quill shaft being arranged on the cross slide and movable in a third linear axis. Such a configuration achieves, on the one hand, a solid structure whilst, on the other, achieving movement of the quill shaft in three axes.

In a particularly preferred embodiment the sensor and/or the gripper are interchangeable on the quill shaft permitting removing and recoupling the sensor and/or the gripper to/from the quill shaft, thus also permitting intermediate holding the sensor and/or the gripper in readiness.

Preferably the sensor is arranged by means of a probe on the quill shaft. Providing a probe facilitates fitting and replacing the sensor when needed.

Preferably the sensor is secured to the quill shaft by means of a coupling device at the probe and/or gripper. This configuration simplifies retrieval and speeds up coupling the sensor and/or the gripper defined in position at the quill shaft, this also facilitating parking the sensor and/or gripper where necessary in a crib.

Preferably the measuring machine comprises as a crib at least one magazine arranged in the movement range of the gripper for accommodating workpieces and/or pallets. Such a pallet is capable of parking a greater number of workpieces, pallets or pallet componented with workpieces. This makes for a greater autonomy in that the magazine can be componented with a large number of workpieces to be measured or a large number of workpieces to be measured can be parked therein. Such a magazine may in addition be suitable to park at least one probe and/or at least one sensor and/or at least one gripper. It is understood that also several or diverse magazines may be provided, also diversely positioned.

In a particularly preferred embodiment the magazine(s) is/are arranged on the measuring machine such that workpieces or pallets componented with workpieces can be transferred and retrieved manually or by means of a handling device from an external location to the corresponding magazine. This configuration enables the measuring machine or the magazine to be componented as needed either manually or by a machine with the workpieces to be measured and to retrieve the measured workpieces.

In another preferred embodiment of the measuring machine a clamping device provided with positioning means is arranged on the machine table by means of which a pallet is precisely positionable at least in the X and Y direction to thus achieve both speedy and accurate positioning of pallets or pallets componented with workpieces on the machine table.

In a particularly preferred embodiment the positioning means are configured so that the pallet is positionable in addition also in the Z direction as well as at least about an axis of rotation in thus making it possible to position and fix in place palletized workpieces three dimensionally and angularly exact even when not rotationally symmetrically configured.

In yet another particularly preferred embodiment it is provided for that the mechanical device is able to transfer and/or retrieve the probe and/or the sensor and/or the gripper to/from a location. This configuration makes it possible to replace or park the probe and/or the sensor and/or the gripper as required in particular instance.

Preferably the gripper is configured as a finger gripper, parallel gripper, forked gripper, magnetic gripper or vacuum gripper, all of which have a proven record of success and are available in diverse embodiments, in addition to which they work reliably well whilst being cost-effective.

A further object of the invention is to propose a method for measuring a workpiece by means of which a measuring machine configured as set forth in any of the preceding claims and which economically is particularly suitable for transferring and retrieving the workpiece to be measured to/from the clamping device of the measuring machine.

Achieving this object is defined by features as set forth in claim 13. By definition the workpiece to be measured or a pallet componented with the workpiece to be measured is picked by means of the gripper from the crib and transferred to the clamping device, after which the surface of the workpiece is sensed or detected by means of the sensor and after completion of the measuring action the workpiece or the pallet componented with the workpiece is retrieved by means of the gripper from the clamping device and transferred to a crib In a preferred further embodiment of the method it is provided for that the probe and/or the sensor before retrieval of a workpiece from the crib and/or before retrieval of a workpiece from the clamping device is decoupled from the quill shaft and parked in a crib. In this way any damage to the probe or sensor during movement of the quill shaft to the measuring location or to the crib is prevented.

In another preferred further embodiment it is provided for that the gripper is decoupled from the quill shaft before a workpiece is measured and transferred to a crib in thus avoiding measuring or its accuracy being influenced in any way by the gripper.

In conclusion, a particularly preferred method is provided wherein the gripper before retrieval of a workpiece from the crib or prior to retrieval of a workpiece from the clamping device is coupled to the quill shaft. This is necessary so that after any uncoupling of the gripper it is resecured to the quill shaft in thus permitting loading and unloading of the crib by means of the gripper.

A preferred example of one embodiment of the invention will now be explained with reference to the drawings in which.

Like parts are identified throughout by like reference numerals in the FIGs.

Figure 1:
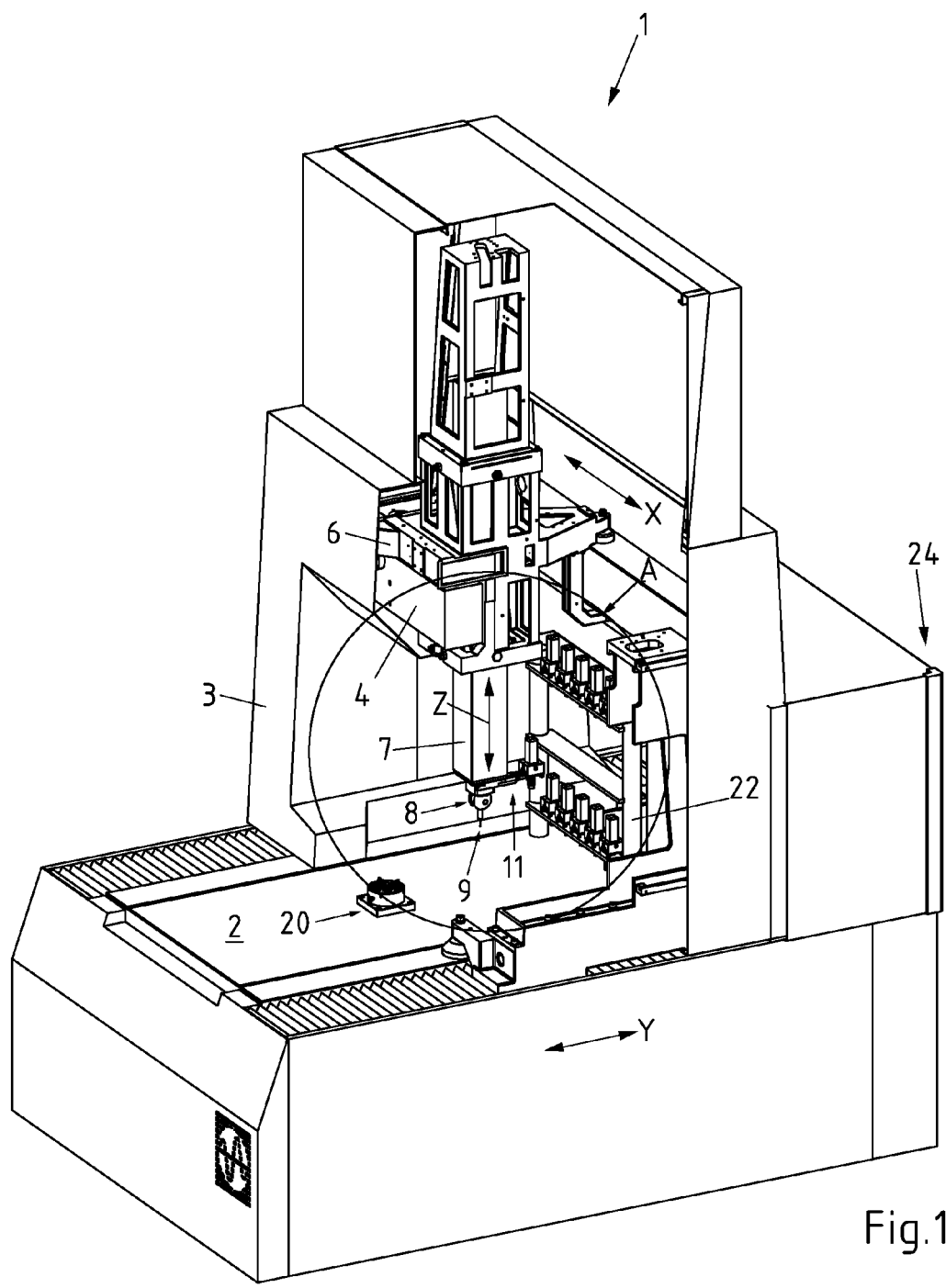
FIG. 1 is a view in perspective of the front/operator side of the measuring machine in a partly sectioned aspect.

Referring now to FIG. 1 there is illustrated a view in perspective of the front/operator side of the measuring machine in a partly sectioned aspect. Since generic measuring machines are known in general, in the following only the most important components or elements relevant in conjunction with the invention are detailed.

The measuring machine 1 comprises a rugged machine table 2 to which a clamping device 20 is secured for fixedly locating a workpiece or a pallet. Arranged on the machine table 2 is a measuring slide 3 engineered to travel along a first linear axis, denoted here as the Y-axis. The measuring slide 3 is provided with a top cross-support 4 on which a cross-slide 6 is arranged for movement along a second linear axis, denoted here as X-axis. The cross-slide 6 mounts a quill shaft 7 which is movable along a third linear axis, denoted here as Z-axis. Bottoming the lower front end of the quill shaft 7 is a probe 8 provided with a sensor 9. The term sensor stands here as representative of any kind of detector, probe, pickup, feeler or the like. In the present example the sensor 9 takes the form of a measuring sensor. Instead of a tactile sensor any other kinds of a sensor such as, for example, an optical sensor or a camera may be put to use.

The cited movable components 3, 6, 7 form together a mechanical device by means of which the sensor 9 is able to be travelled in three coordinate axes oriented at least approximately at a right angle to each other such that the surface of a workpiece (not shown) can be measured when clamped in place on the machine table 2 by means of the clamping device 20.

The measuring machine 1 comprises furthermore a crib in the form of a magazine 22. The magazine is arranged preferably immobile on the machine table 2 or in the vicinity thereof. This magazine 22 is capable of receiving a plurality of palletized workpieces, i.e. workpieces fixed in place on pallets. In the present example the magazine 22 features for example three holding planes in each of which a plurality of pallets componented with workpieces can be held in transit as will be detailed further on. The magazine 22 is secured to the machine table 2 such that workpieces or pallets componented with workpieces can be transferred from externally into the magazine 22 and retrieved therefrom. Transferring workpieces or pallets componented with workpieces from an external location into the magazine 22 is preferably done manually, although it is just as feasible to also make the transfer by means of a handling device. Instead of a crib or magazine it is, of course, just as possible to provide a plurality of cribs or magazines even also at differing locations.

Arranged bottoming the quill shaft 7 is in addition a gripper 11 extending laterally away from the quill shaft 7. This gripper 11 serves to pick the workpieces or pallets from the magazine 22 and transfer them to the clamping device 20, or coversely, to pick them from the clamping device 20 and transfer them to the magazine 22. In the present example the gripper 11 is engineered as a so-called finger gripper comprising two fingers each swivable about an axis as will be detailed further on. Such a gripper 11 is particularly suitable to grip pallets at a predefined location, for instance the top end of a collet extending down from the pallet. It is understood that, of course, other types of grippers can be employed.

The gripper 11 is actuated preferably pneumatically or electrically, the control and power feed being possible via cables or ducting at the quill shaft 7. Preferably the probe 8 and/or the gripper 11 are secured replaceable on the quill shaft 7, the advantages of which will be detailed further on. As an alternative, of course, a passive gripper, for example a forked gripper, may be employed.

Where the sensor 9 is secured replaceable at the probe 8 the sensor 9 can be held in transit for example in a parking location or in the magazine 22 whilst a workpiece is transferred into the clamping device 20 or retrieved therefrom. The advantage of this is that when the quill shaft 7 is on the move, namely during feeding a workpiece into the clamping device 20 or when being retrieved therefrom, the sensor 9 cannot be damaged since it is uncoupled from the quill shaft 7. It is understood that holding the sensor 9 in transit depends particularly on the geometric circumstances of the measuring machine 1 and its components, for example the clamping device 20. Preferably the measuring machine 1 is engineered in such a way that holding the sensor 9 in transit is capable of being achieved fully automatically, the sensor 9 for this purpose being fixed in place preferably by means of a coupling device to the probe 8 secured to the quill shaft 7. Such a configuration has the further advantage that the sensor 9 can be replaced by another sensor in thus additionally achieving a replacement and employment of diverse sensors.

Preferably the coupling device provided to secure the sensor 9 at the most features clamping and centering elements for speedy, precise positioning of the sensor 9 at the probe 8. In addition, such a coupling device preferably features bushings for the passage of conduits for control and/or measurement. And, of course, where necessary, any necessary power feed can also be achieved via bushings in the coupling device.

On the other hand the gripper 11 can also be secured to the quill shaft 7 by means of a coupling device of the cited kind replaceably. Providing a coupling device has the advantage that also the gripper 11 is replaceable when needed in case, too, the coupling device features preferably bushings for the passage of conduits for control and/or measurement. Yet another advantage of providing a coupling device may also exist in that the gripper 11 during measurement of workpiece can be parked out of the way to avoid collisions and thus damage to the gripper 11 or other elements of the machine. In addition, any influence on the accuracy of the measurement and thus on its result is avoidable since neither the weight of the gripper nor moments of force exerted by the gripper on the quill shaft can detriment the accuracy of the measurement which, of course, especially makes sense when workpieces need to be measured with very high accuracy.

In addition to the machine table 2 which usually constitutes a massive stone slab, the elements of the mechanical device, namely the measuring slide 3 together with its upper cross support 4, cross slide 6 and quill shaft 7 are configured so rugged that the mechanical device as a whole is able on the one hand, of carrying weights as high as 50 kg, on the other is nevertheless able to implement highly accurate measurements of workpieces as large as approximately, 700×700×700 mm.

Figure 2:
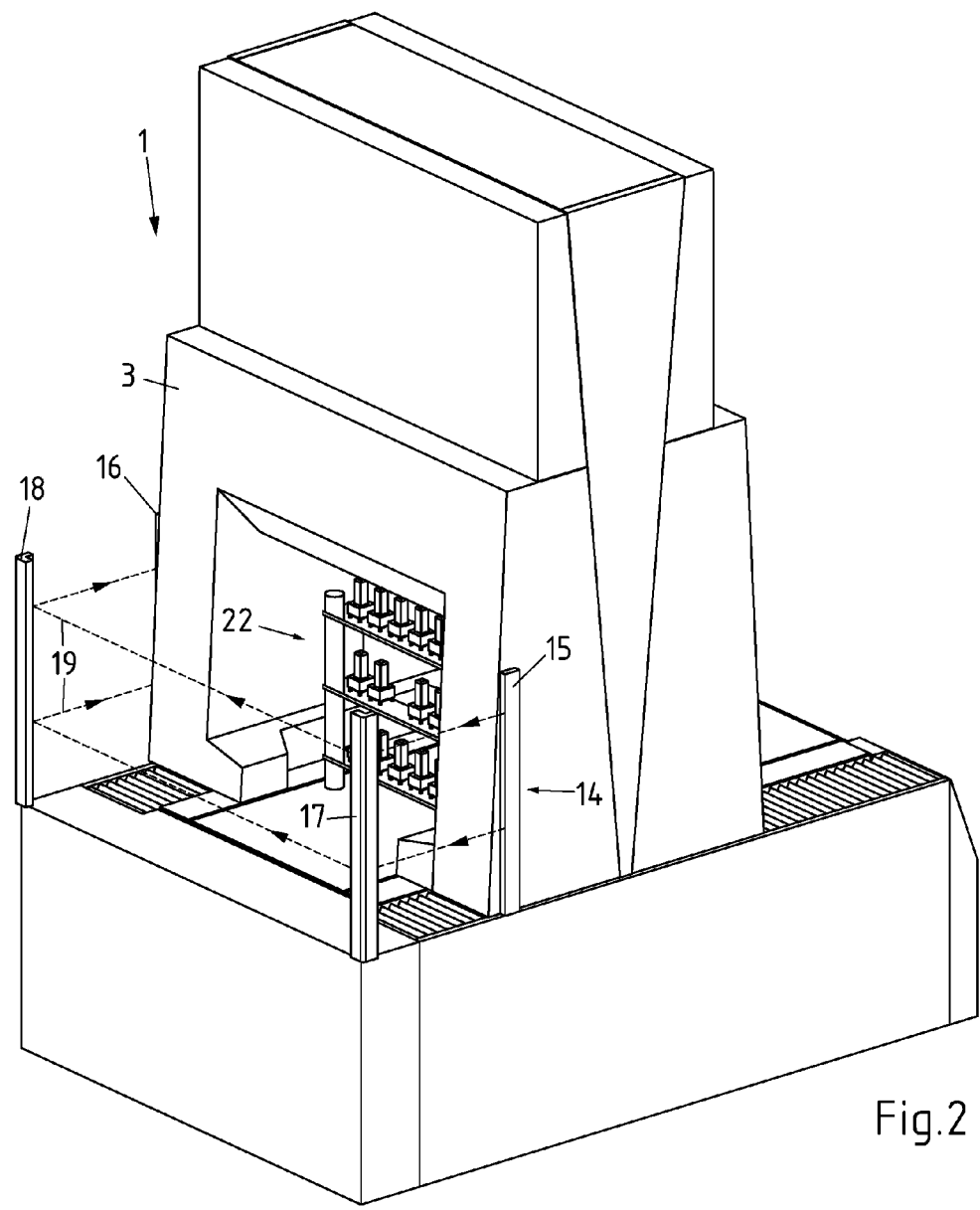
FIG. 2 is a view in perspective of the rear side of the measuring machine.

Referring now to FIG. 2 there is illustrated a rear view of the measuring machine 1. Particularly evident in this view is a photocell assembly denoted in its entirety by reference numeral 14 which is intended to prevent injury of operators due to movements of the mechanical device. The photocell assembly 14 comprises an emitter assembly 15, a detector assembly 16 as well as two reflectors 17, 18 disposed inbetween. The emitter assembly 15 comprises a stack of emitters, whilst the detector assembly 16 consists of a stack of detectors. Emitters may be, for example, LEDs whilst photodiodes may be employed as detectors. The emitter assembly 15 in this assembly emits electromagnetic radiation—light—in the direction of the reflectors 17, which deflects the light through 90° in the direction of the second deflector 18. This second deflector 18 deflects the light in the direction of the detector assembly 16. The light beams are illustrated by means of broken lines 19. The photocell assembly 14 forms a U-shaped curtain of light extending around the rear of the measuring machine 1, the measuring slide 3 and the magazine 22. As soon as this light curtain is interrupted, for instance by a hand of the operator whilst the measuring slide is in a region dangerous for the operator, any dangerous motion of the mechanical device, namely the measuring slide 3, the cross slide as well as the quill shaft is instantly halted. Preferably for this purpose an additional sensor (not shown) is arranged on the measuring slide 3.

Figure 3:
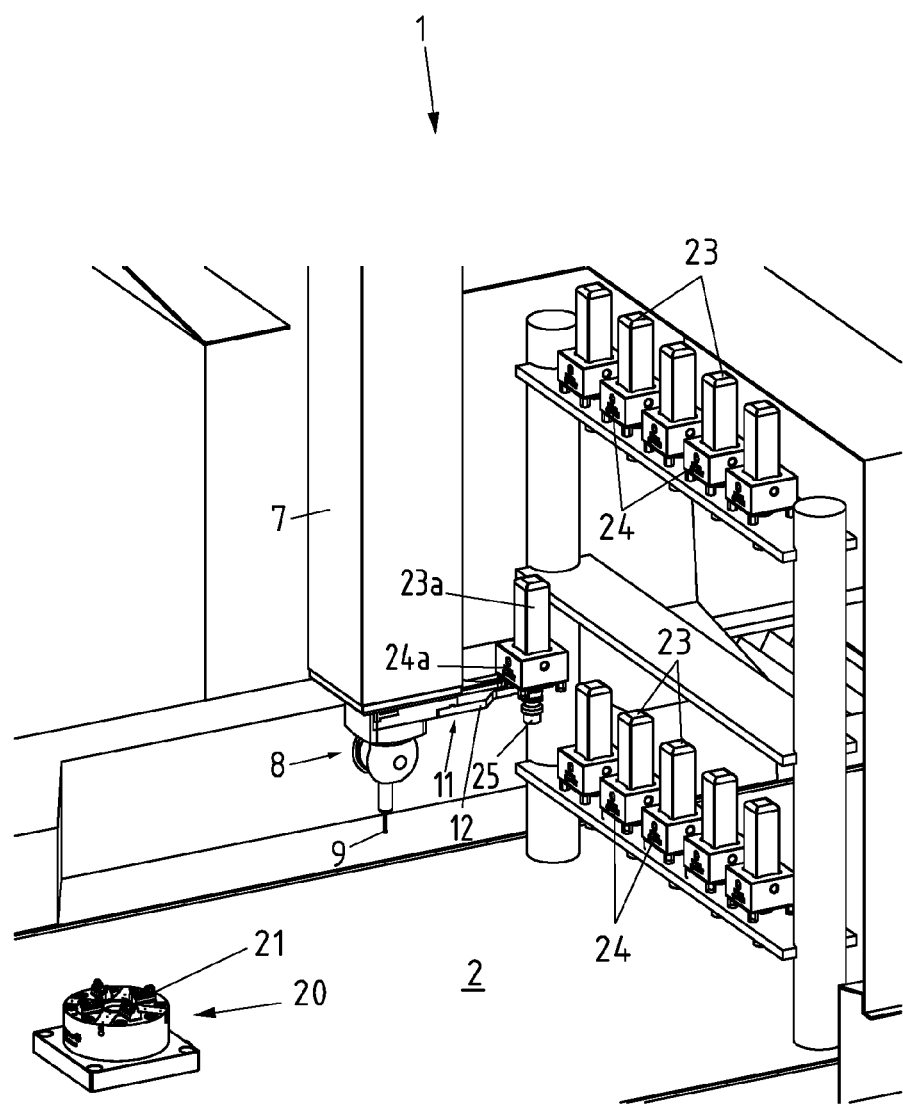
FIG. 3 is a magnified view of the aspect as shown in FIG. 1.

Referring now to FIG. 3 there is illustrated in a magnified partial view of the measuring machine as shown in FIG. 1 showing the workpieces 23 parked in two planes in the magazine 22, each workpiece 23 being fixed in place on a pallet 24. In the middle crib plane no workpieces are parked in this example. Furthermore evident are probes 8 fixed to the bottom end of the quill shaft 7 with the sensor 9 arranged at the end side. The sensor—9—extends beyond the quill shaft 7 vertically downwards. Also evident is the gripper 11 extending horizontally projecting from the quill shaft 7 at the bottom side, the fingers 12 of which grip a pallet 24a with a workpiece 23a fixed in place thereon. The gripper 11 grips the top end of a collet 25 projecting downwards from the pallet 24a. By means of the collet 25 the pallet 24a is fixedly clamped in place after being transferred into the chuck 21 of the clamping device 20. For this purpose the chuck 21 is in addition provided with a pneumatically activated clamping mechanism, spring force being preferably used to securely clamp a pallet 24 whilst release of the spring-loaded clamping members is done pneumatically so that should there be any failure or leak in the pneumatical device the pallet remains fixed in place.

Figure 4:
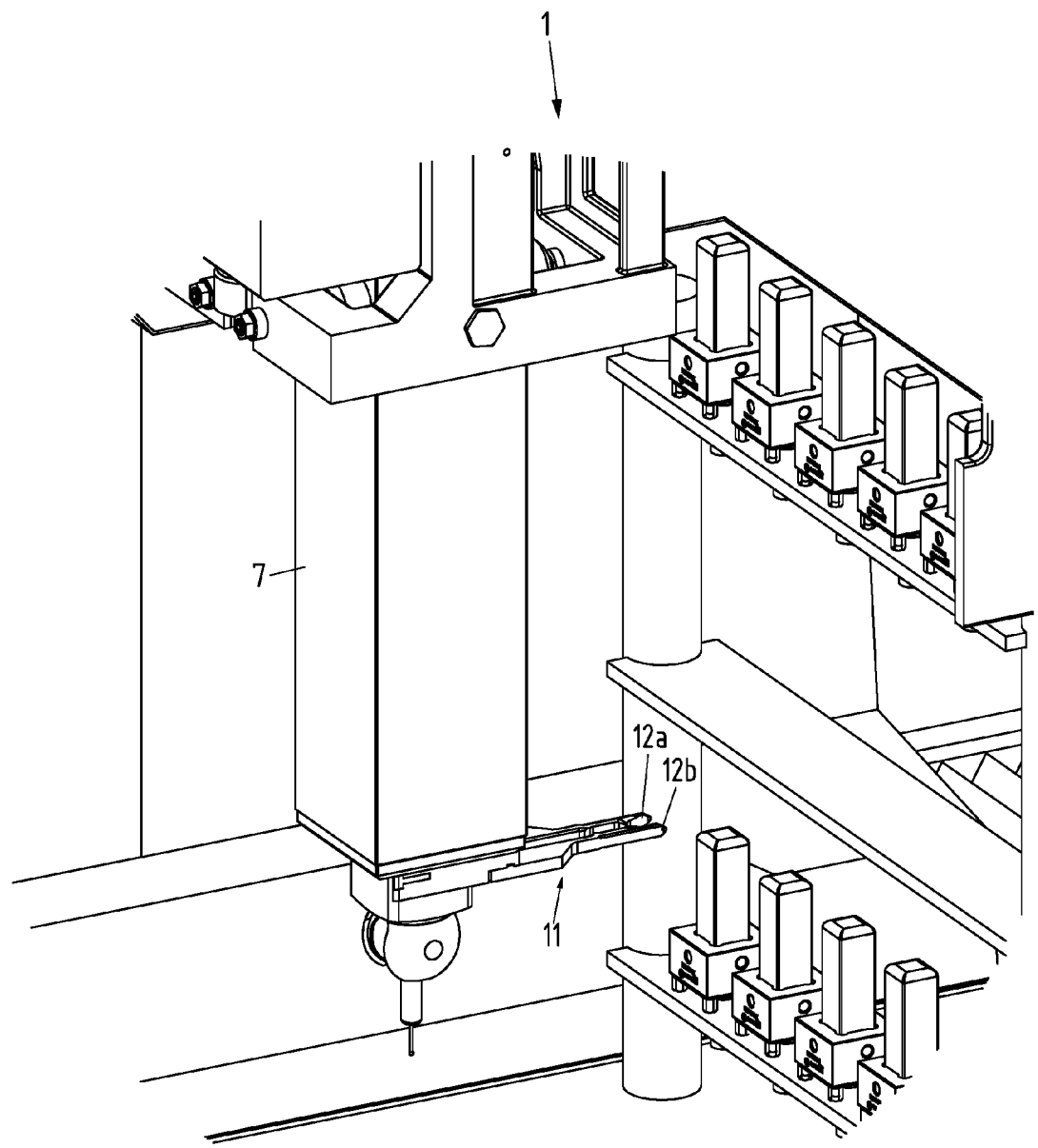
FIG. 4 is a detail of the measuring machine in again a magnified view.

Referring now to FIG. 4 there is illustrated again in a magnified partial view of the measuring machine 1 in which particularly the two fingers 12 of the gripper 11 are evident. The gripper 11 is arranged at the bottom of the quill shaft 7 such that it projects therefrom sideways.

Figure 5:
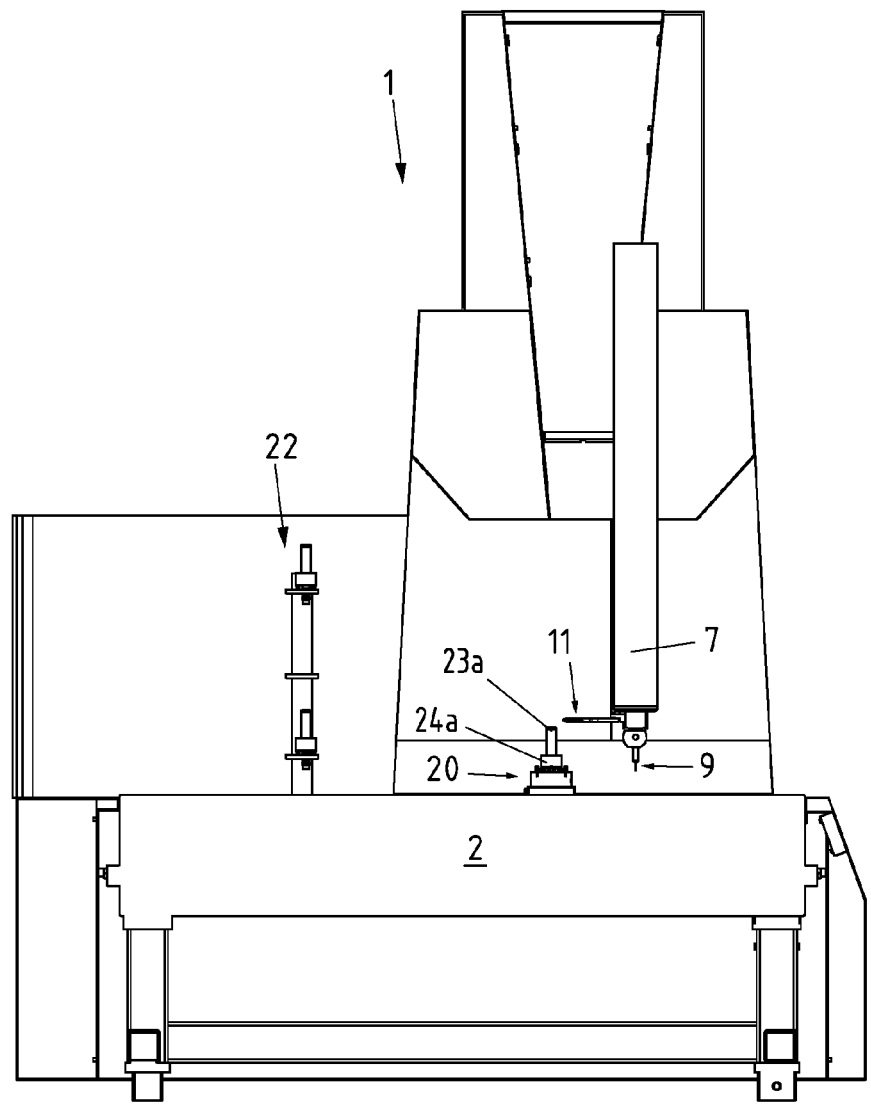
FIG. 5 is a side view of the measuring machine in a sectional aspect.

Referring now to FIG. 5 there is illustrated a diagrammatic side view of the measuring machine 1 in a sectioned view. In this example the pallet 24a is fixedly secured in place on the machine table 2 by means of the clamping device 20. The clamping device 20 is provided with positioning means permitting exact positioning of the pallet at least in the X and Y direction, preferably positioning means are provided which position the pallet also in the Z direction as well as preferably about at least one axis of rotation, particularly preferred about the three axes of rotation a, b and c. By means of the clamping device 20 the workpiece 23a fixedly clamped in place on the pallet 24a is fixedly and precisely positioned for it to be sensed by the sensor 9 and measured. Furthermore evident from this view are the quill shaft 7, the gripper 11 as well as the magazine 22.

Although reference is made in the present document to a workpiece each time, this is not to be understood just as a workpiece in the conventional sense but also to represent likewise tools such as, for example, electrodes or the like.

The advantages of the measuring machine engineered in accordance with the invention can be itemized as follows:
- cost-effective solution for automatically feeding workpieces to the measuring location and for automatically retrieval thereof;
- simple in its achievement being engineered on the existing mechanical device of the measuring machine;
- stand-alone achievement;
- suitable for retrofitting to existing measuring machines when required;
- small footprint due to no additional robotic loading device being needed;
- autonomic functioning possible over several hours depending on the size of the magazine/crib;
- designed for reliable operation with integrated fail-safe such as, for example, by a LED assembly.

It is understood that the example embodiment as detailed with reference to the drawings is not at all to be interpreted as being conclusive, but instead configurations deviating from the example embodiment as explained are just as possible within the scope of protection afforded by the claims on invention. Thus, the gripper may be engineered differently, for example, in the form of a finger gripper, a parallel gripper or a passive positive action gripper such as for instance a forked gripper. But also magnetic or vacuum grippers are just as well suited, it also being possible to provide more than one gripper and/or more than just one sensor. As an alternative to a tactile sensor, non-contacting, for example, an optical sensor can be put to use. It is also just as possible to vary the number and/or arrangement of the crib or magazine(s), by arranging the crib above or alongside the machine table. The crib or magazine can also be configured differently by, for instance, taking the shape of a rack, a stacked magazine, a rotary tower or a slide. Where necessary the mechanical device may also feature more than three linear axes and/or additionally comprise one or more axes of rotation. Basically it would also be possible to engineer the magazine replaceable so that the workpieces to be measured would not be transferred from an external location into the magazine, but instead, the magazine replaced in its entirety each time. In this arrangement the magazine already componented with the workpieces to be measured would be replaced by another magazine which is componented with the components still to be measured. In conclusion, instead of an LED array alternatively, preferably electronic guard features such as for instance a cam device or a laser array could be provided, although basically also mechanical guard features are feasible.

What is claimed is:

1. A measuring machine for measuring workpieces comprising a machine table and a mechanical device including a quill shaft movable in at least three linear axes on which a sensor can be fixedly secured, by means of which the surface of a workpiece securely clamped in place by a clamping device to the machine table can be sensed, wherein the measuring machine is assigned a crib for holding a plurality of workpieces to be measured or the measuring machine includes a crib for holding a plurality of workpieces to be measured, wherein the quill shaft is configured such that in addition to the sensor also a gripper is fixable thereto, by means of which a workpiece is transferable from the crib to the clamping device or retrieved from the clamping device and transferred to the crib.

2. The measuring machine as set forth in claim 1, wherein the workpieces to be measured are arranged on pallets, and the clamping device is configured to clamp the pallets componented with workpieces and the gripper serves to pick the pallets componented with workpieces.

3. The measuring machine as set forth in claim 1, wherein the mechanical device includes a measuring slide movable in a first linear axis and a cross slide movable in a second linear axis the quill shaft being arranged on the cross slide and movable in a third linear axis.

4. The measuring machine as set forth in claim 1, wherein the sensor and/or the gripper are arranged replaceable on the quill shaft.

5. The measuring machine as set forth in claim 4, wherein the sensor is arranged by means of a probe on the quill shaft.

6. The measuring machine as set forth in claim 1, wherein the sensor is secured by a coupling device to the probe and/or the gripper is secured by a coupling fixture to the quill shaft.

7. The measuring machine as set forth in claim 1, wherein the measuring machine includes as said crib a magazine arranged in the movement range of the gripper for containing workpieces and/or palleted workpieces and/or pallets and/or at least one probe and/or at least a sensor and/or at least a gripper.

8. The measuring machine as set forth in claim 7, wherein the magazine is arranged on the measuring machine such that workpieces or pallets componented with workpieces can be transferred and retrieved manually or by a handling device from an external location to the corresponding magazine.

9. The measuring machine as set forth in claim 1, wherein a clamping device provided with positioning means is arranged on the machine table by means of which a pallet is precisely positionable at least in the X and Y direction.

10. The measuring machine as set forth in claim 1, wherein the positioning means are configured so that the pallet is positionable in addition also in the Z direction as well as at least about an axis of rotation.

11. The measuring machine as set forth in claim 9, wherein the mechanical device is configured to transfer and/or retrieve the probe and/or the sensor and/or the gripper to/from a crib.

12. The measuring machine as set forth in claim 1, wherein the gripper is configured as a finger gripper, parallel gripper, fork gripper, magnetic gripper or vacuum gripper.

13. A method for measuring a workpiece by means of a measuring machine configured as set forth in any of the preceding claims, characterized in that the workpiece to be measured or a pallet componented with the workpiece to be measured is picked by means of the gripper from the crib and transferred to the clamping device, after which the surface of the workpiece is sensed or detected by means of the sensor and after completion of the measuring action the workpiece or the pallet componented with the workpiece is retrieved by means of the gripper from the clamping device and transferred to a crib.

14. The method as set forth in claim 13, wherein the sensor and/or the probe is/are arranged replaceable on the quill shaft of the measuring machine, characterized in that the probe and/or the sensor before retrieval of a workpiece from the crib and/or before retrieval of a workpiece from the clamping device is/are decoupled from the quill shaft and parked in a crib.

15. The method as set forth in claim 13, characterized in that the gripper, before measurement of a workpiece, is decoupled from the quill shaft and transferred to a crib.

16. The method as set forth in claim 15, characterized in that the gripper, before retrieval of a workpiece from the crib or before retrieval of a workpiece from the clamping device is coupled to the quill shaft.

* * * * *